Figure 1:
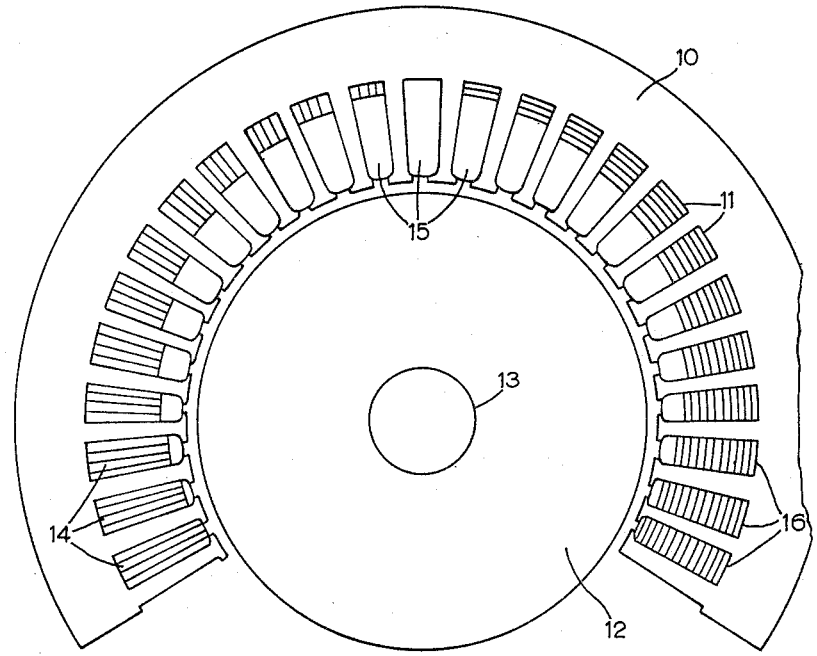

Dec. 15, 1964    F. C. WILLIAMS ETAL    3,161,814
ALTERNATING CURRENT MOTOR

Filed March 27, 1961    9 Sheets-Sheet 1

INVENTORS
FREDERIC CALLAND WILLIAMS.
ERIC ROBERTS LAITHWAITE.
JOHN FREDERICK EASTHAM.
BY
Stevens, Davis, Miller & Mosher
Attorneys Dec. 15, 1964  F. C. WILLIAMS ETAL  3,161,814
ALTERNATING CURRENT MOTOR
Filed March 27, 1961  9 Sheets-Sheet 2

INVENTORS
FREDERIC CALLAND WILLIAMS.
ERIC ROBERTS LAITHWAITE.
JOHN FREDERICK EASTHAM.
BY
Stevens, Davis, Miller & Mosher
Attorneys Dec. 15, 1964    F. C. WILLIAMS ETAL    3,161,814
ALTERNATING CURRENT MOTOR
Filed March 27, 1961    9 Sheets-Sheet 3
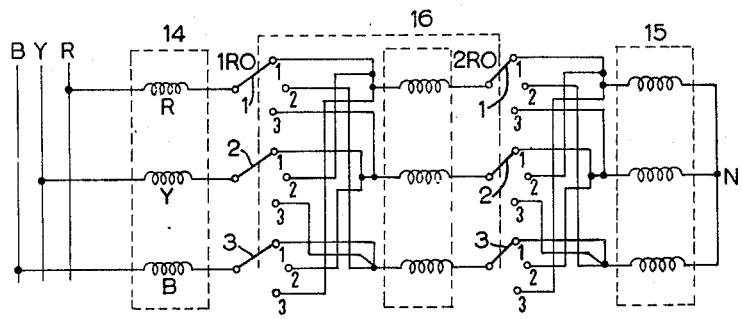
FIG. 7.
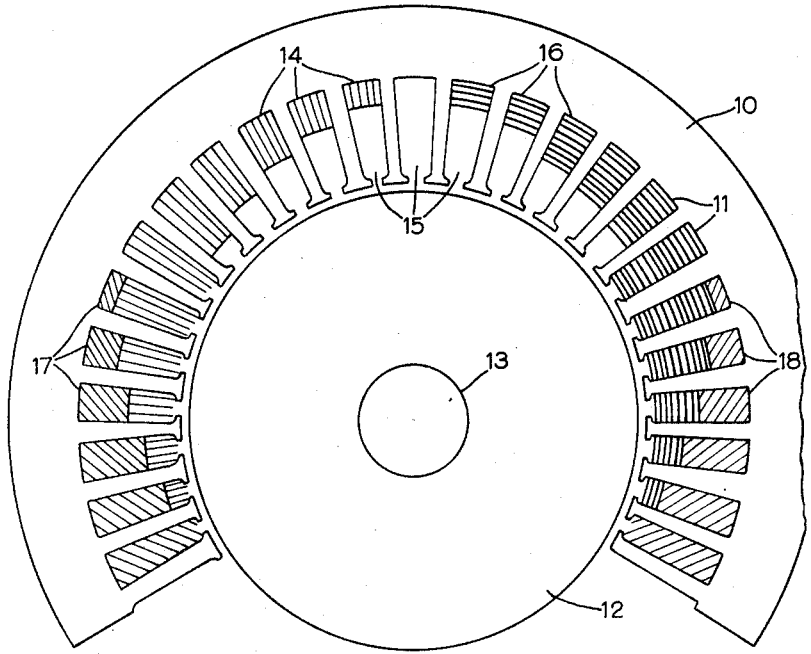
FIG. 8.
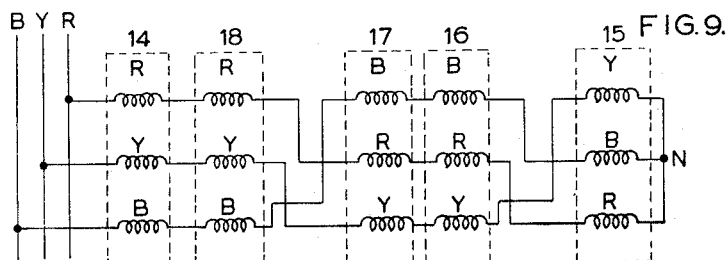
INVENTORS
FREDERIC CALLAND WILLIAMS.
ERIC ROBERTS LAITHWAITE.
JOHN FREDERICK EASTHAM.
BY
Stevens, Davis, Miller & Mosher
Attorneys Dec. 15, 1964  F. C. WILLIAMS ETAL  3,161,814
ALTERNATING CURRENT MOTOR
Filed March 27, 1961  9 Sheets-Sheet 4

INVENTORS
FREDERIC CALLAND WILLIAMS.
ERIC ROBERTS LAITHWAITE.
JOHN FREDERICK EASTHAM.
BY
Stevens, Davis, Miller & Mosher
Attorneys Dec. 15, 1964  F. C. WILLIAMS ETAL  3,161,814
ALTERNATING CURRENT MOTOR
Filed March 27, 1961  9 Sheets-Sheet 6
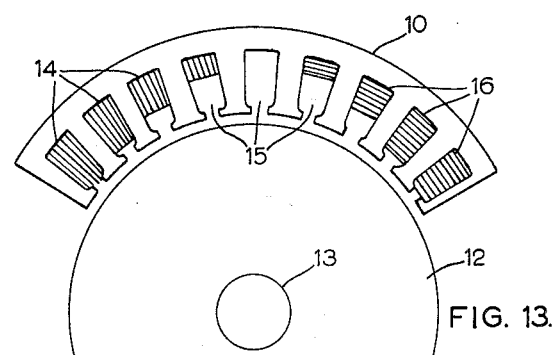
FIG. 13.
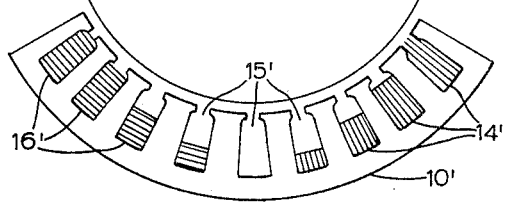
FIG. 21.
INVENTORS
FREDERIC CALLAND WILLIAMS.
ERIC ROBERTS LAITHWAITE.
JOHN FREDERICK EASTHAM.
BY
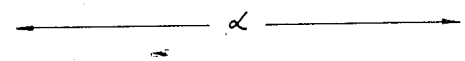
Attorneys

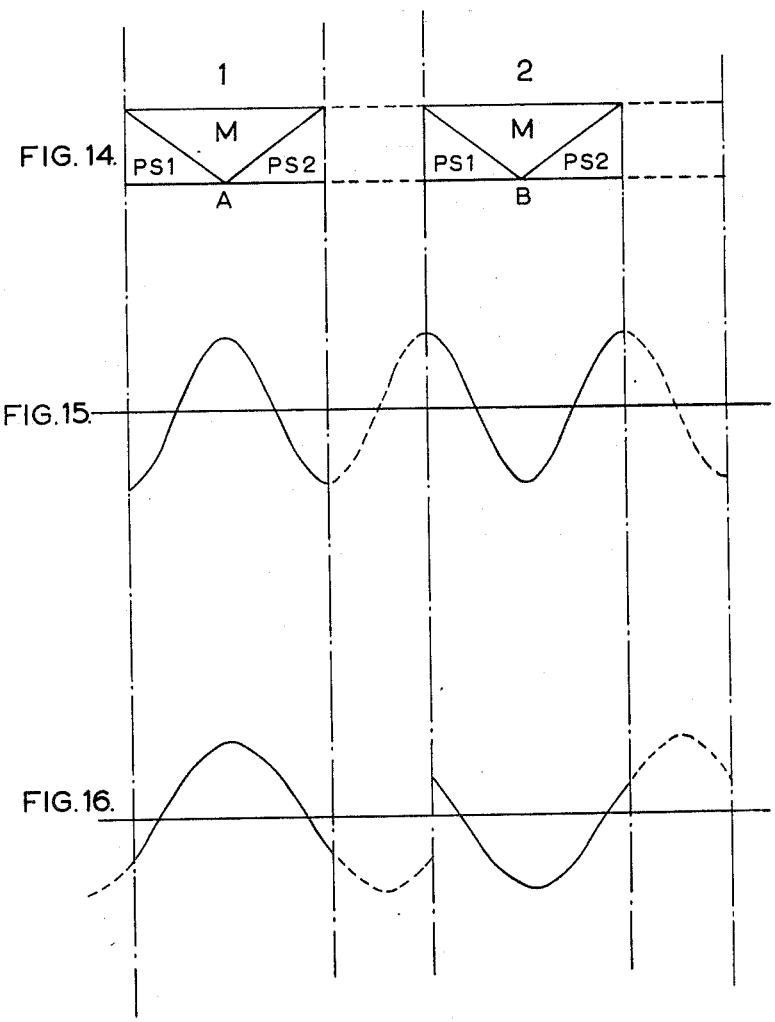

Dec. 15, 1964   F. C. WILLIAMS ETAL   3,161,814
ALTERNATING CURRENT MOTOR
Filed March 27, 1961   9 Sheets-Sheet 8

INVENTORS
FREDERIC CALLAND WILLIAMS.
ERIC ROBERTS LAITHWAITE.
JOHN FREDERICK EASTHAM.
BY
Stevens, Davis, Miller & Mosher
Attorneys Dec. 15, 1964   F. C. WILLIAMS ETAL   3,161,814
ALTERNATING CURRENT MOTOR Filed March 27, 1961   9 Sheets-Sheet 9

INVENTORS
FREDERIC CALLAND WILLIAMS.
ERIC ROBERTS LAITHWAITE.
JOHN FREDERICK EASTHAM.
BY
Stevens, Davis, Miller & Mosher
Attorneys

United States Patent Office

3,161,814
Patented Dec. 15, 1964

3,161,814
ALTERNATING CURRENT MOTOR
Frederic Calland Williams, Romily, Eric Roberts Laithwaite, Cheadle, and John Frederick Eastham, Preston, England, assignors to National Research Development Corporation, London, England, a British corporation
Filed Mar. 27, 1961, Ser. No. 98,437
Claims priority, application Great Britain Mar. 31, 1960
8 Claims. (Cl. 318—224)

The present invention relates to alternating current machines and is more particularly concerned with induction machines which are capable of operating at different speeds.

In United States application No. 844,457, now Patent No. 3,040,226, an induction machine has been described in which continuous variation in the speed of the machine is obtained by effectively varying the number of poles generated by the stator or primary winding. This is effected by feeding current from the mains and current from at least one phase-shifting device in suitable proportions to the conductors in the slots of the primary winding core, the effect being to "stretch" the poles when the phase-shifting device is adjusted in one direction relative to the mains current and to "shrink" the poles when the phase-shifting device is adjusted in the other direction realtive to the mains current. Such a machine may be termned a "phase-mixing" machine.

As previously mentioned, the speed control in the previously proposed phase-mixing machine is continuous and this is obtained at the expense of providing at least one phase-shifting device. However, in many industrial uses of induction machines, continuous speed control is not essential and a machine having a number of discrete speeds within a desired range may frequently be sufficient.

It is the main object of the present invention to provide a phase-mixing induction machine which will satisfy this requirement. A further object of the invention is to provide a phase-mixing induction machine which has the characteristics of a conventional induction machine as regards output and efficiency.

According to the invention, in an alternating current machine having a stator winding consisting of a slotted structure provided with a plurality of sets of coils which are so arranged that the magnetomotive force in at least some of the slots is generated by the addition of the magnetomotive forces caused by current flow in the conductors of coils of at least two sets and each set of coils is so arranged that the magnitude of the current flow in the conductors of the slots due to the coils of one set is a single-valued function of the distance along the arc of the slotted structure occupied by said one set of coils, switching arrangements are provided for altering the interconnections between coils of the different sets to enable different predetermined values of the average phase difference between the currents in adjacent slots to be obtained.

According to one aspect of the invention, in an induction machine having a stator or primary winding for generating a moving magnetic field and consisting of a slotted structure provided with a plurality of sets of coils, which are fed with current from a polyphase supply and which are so arranged that the magnetomotive force in at least some of the slots is generated by the addition of the magnetomotive forces caused by the current flow in the conductors of coils of at least two sets and each set of coils is so arranged that the magnitude of the current flow in the conductors of the slots due to the coils of one set is a single-valued function of the distance along the arc of the slotted structure occupied by said one set of coils, switching arrangements are provided which enable the different phases of the current supply to be fed in different combinations to corresponding coils of the sets to enable different predetermined values of the average phase difference between the currents in adjacent slots to be obtained whereby the speed of the machine is capable of being adjusted to an equal number of discrete values.

According to another aspect of the invention, in an induction machine having a stator or primary winding for generating a moving magnetic field and consisting of a slotted structure provided with a plurality of sets of coils which are fed with current from a polyphase supply and which are so arranged that the magnetomotive force in at least some of the slots is generated by the addition of the magnetomotive forces caused by the current flow in the conductors of coils of at least two sets and each set of coils is so arranged that the magnitude of the current flow in the conductors of the slots due to the coils of one set is a single-valued function of the distance along the arc of the slotted structure occupied by said one set of coils, current being fed to the sets of coils in such a manner that the average phase difference between the current flow in the conductors of the coils of adjacent slots is the same for all adjacent slots, the plurality of sets of coils are so arranged that they are capable of resolution into two groups each group consisting of a number of sets equal to said plurality of sets and forming a separate primary winding, the two primary windings being offset with respect to one another while the currents fed to corresponding coils of corresponding sets in the two groups are opposite.

The invention will be better understood from the following description of a number of embodiments taken in conjunction with the accompanying drawings comprising FIGS. 1 to 22. Of the drawings, FIG. 1 shows diagrammatically one form of the machine employing a stator comprising three sets of coils.

Figure 2:
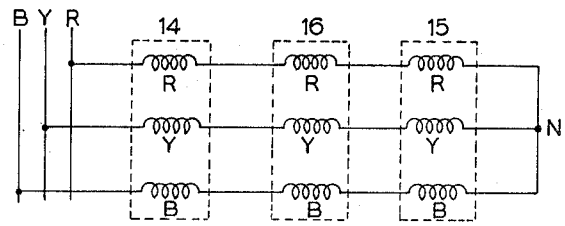
Figure 3:
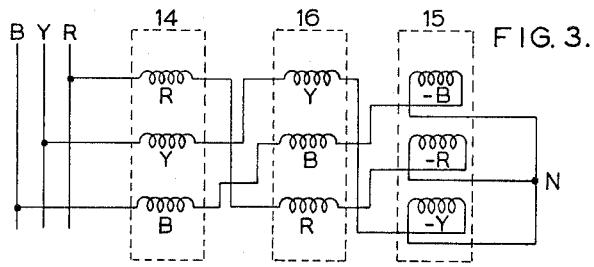
Figure 4:
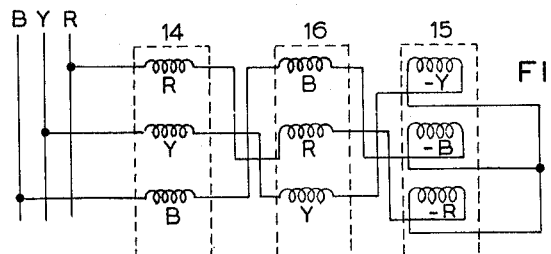
Figure 5:
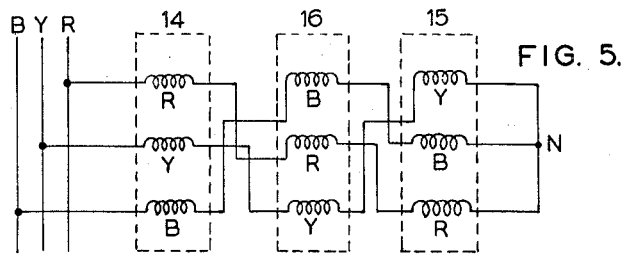
Figure 6:
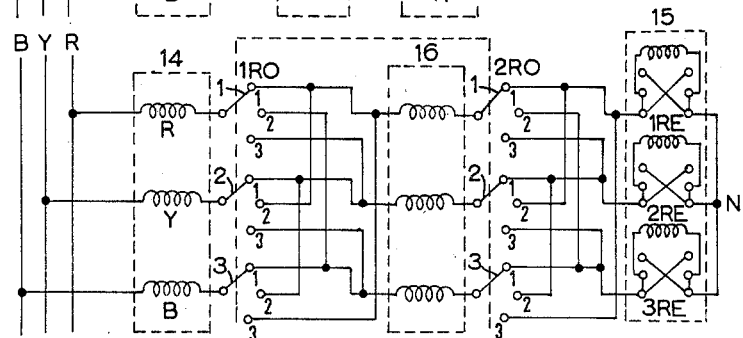
Figure 10:
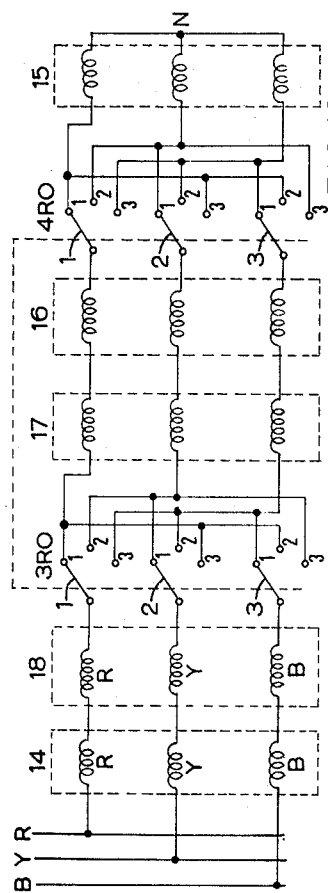
Figure 11:
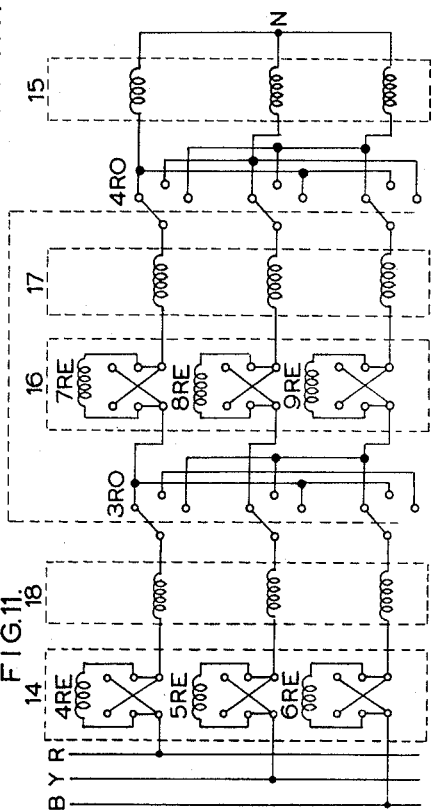
Figure 12:
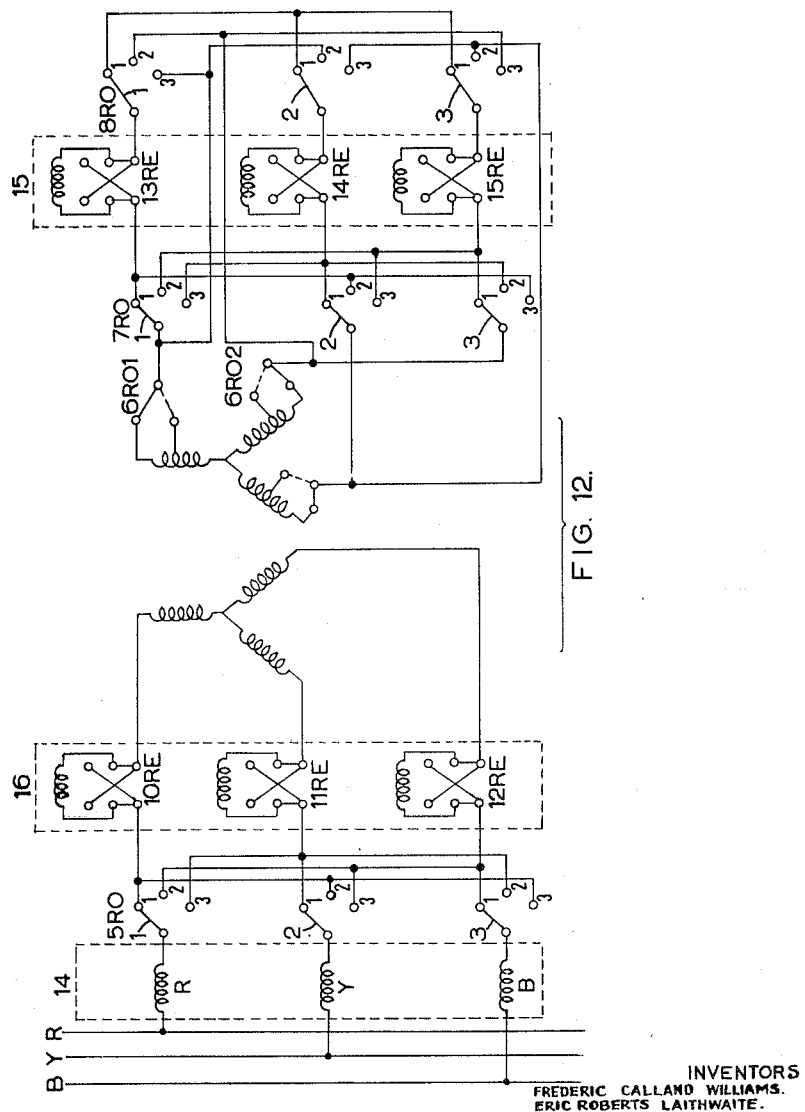
Figure 18:
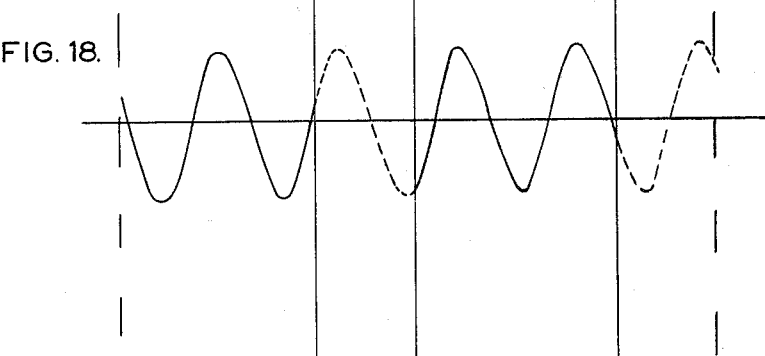
Figure 19:
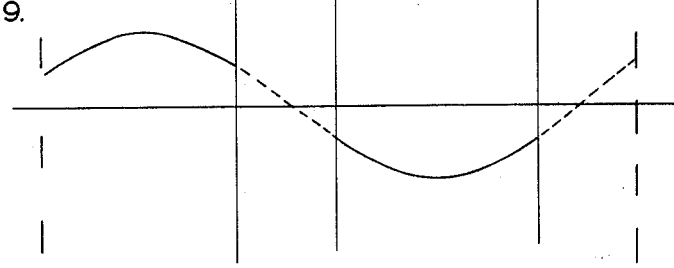
Figure 20:
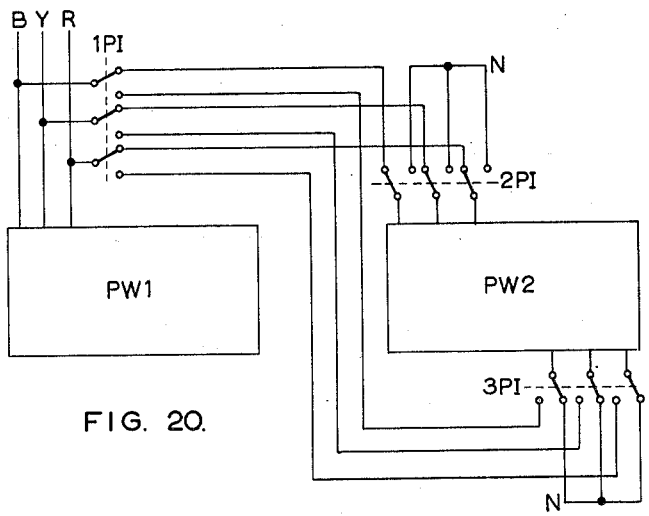
Figure 22:
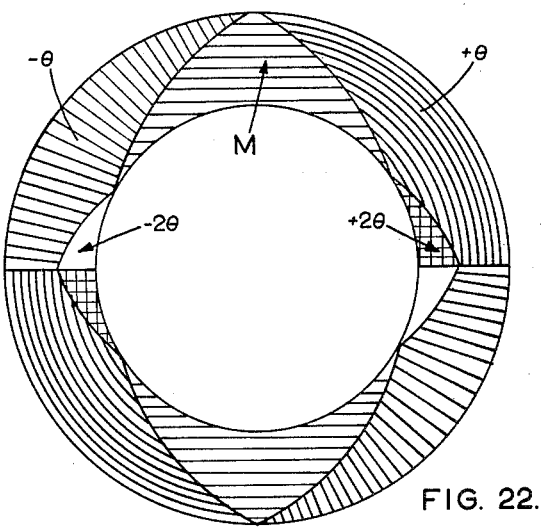

FIG. 2 shows the way in which the three sets of coils forming the stator are fed from the mains supply to give zero phase difference, FIG. 3 shows the way in which the three sets of coils forming the stator are fed from the mains supply to give a phase difference of +60 degrees, FIG. 4 shows the way in which the three sets of coils forming the stator are fed from the mains supply to give a phase difference of —60 degrees, FIG. 5 shows the way in which the three sets of coils forming the stator are fed from the mains supply to give a phase difference of +120 degrees, FIG. 6 shows one form of switching arrangement for use with three sets of coils to give phase differences of ±60 degrees and ±120 degrees, FIG. 7 shows one form of switching arrangement to give a phase difference of ±120 degrees, FIG. 8 shows diagrammatically another form of the machine employing a stator comprising five sets of coils, FIG. 9 shows the way in which the five sets of coils forming the stator are fed from the mains supply to give a phase difference of ±240 degrees, FIG. 10 shows one form of switching arrangement for use with five sets of coils to give a phase difference of ±240 degrees, FIG. 11 shows a development of the switching arrangement shown in FIG. 10 for use with five sets of coils to give phase difference of ±120 degrees and ±240 degrees, FIG. 12 shows one form of switching arrangement which enables nine different phase differences to be obtained, FIG. 13 shows diagrammatically a further form of machine employing two stator blocks each comprising three sets of coils, FIG. 14 shows in developed form the two stator blocks of the embodiment of FIG. 13, FIGS. 15 to 19 show the waveforms of the magnetic field generated under different conditions in the embodiment of FIG. 14, FIG. 20 shows one form of the additional switching arrangements necessary to phase invert the currents fed to the two primary windings of the embodiment shown in FIG. 14, FIG. 21 shows a further form of stator block, FIG. 22 shows diagrammatically a form of stator which is continuous.

One embodiment of the phase-mixing machine takes the form illustrated in FIG. 1 of the accompanying drawings where 10 is the primary winding core or block provided with slots 11 in which the primary winding is located. The rotor 12 is conventional squirrel cage type of which the details are not shown, the rotor being mounted on the shaft 13 which is rotatable in bearings on the machine frame (not shown). The primary winding consists of three sets of coils 14, 15 and 16 which are energised directly in such a manner that the phase of the current flowing through the coils of set 14 is advanced (or retarded) with respect to the current flowing through the coils of set 15 while the phase of the current flowing through the coils of set 16 is retarded (or advanced) with respect to the current flowing through the coils of set 15.

If the three sets of coils are connected to the three phases of the supply in the manner shown in FIG. 2 of the accompanying drawings, there will be no phase difference between the corresponding phase coils of the three sets, the neutral point being indicated by N. If, however, the coils of the three sets are connected in the manner shown in FIG. 3 of the accompanying drawings, there will be a phase difference of 60 degrees between the currents in the corresponding coils of sets 15 and 16 and between the currents in the corresponding coils of sets 15 and 14. Further the phase of the currents in the coils of set 14 is advanced with respect to the phase of the currents in the coils of the set 15 while that in the coils of set 16 is retarded with respect to that in the coils of the set 15. This condition will be considered as the positive condition. If the coils of the three sets are connected in the manner shown in FIG. 4 of the accompanying drawings, there will still be a phase difference of 60 degrees between the currents in corresponding coils of sets 15 and 16 and sets 15 and 14. In this case, however, the phase of the currents in the coils of set 14 will be retarded with respect to the currents in the coils of set 15 while that in the coils of set 16 will be advanced with respect to that in the coils of the set 15. This condition will be considered as the negative condition. Further, if the coils fed by the negative phase supply shown in FIGS. 3 and 4 are instead fed by the positive phase supply as shown in FIG. 5 of the accompanying drawings for the positive condition, there will be a phase difference of 120 degrees between the currents in the corresponding coils of sets 15 and 16 and between the currents in the corresponding coils of sets 15 and 14 and the same phase difference could be obtained for the negative condition.

It will be understood that if the phase of the currents in the coils of set 14 is advanced by 60 degrees with respect to the phase of the currents in the coils of set 15 while that in the coils of set 16 is retarded by 60 degrees with respect to that in the coils of the set 15, twice 60 degrees, i.e., 120 degrees will be added to the total phase displacement in the moving magnetic field between the two ends of the primary winding. Similarly if the phase differences are reversed, i.e., the negative condition, 120 degrees will be subtracted from the total phase displacement. Thus, for example, if with the arrangement of FIG. 2 of the accompanying drawings, the primary winding gives 4 poles, then when 60 degrees phase difference is applied in the positive sense, the number of poles will be $$4 + \frac{2 \times 60}{180} \text{ i.e. } 4\tfrac{2}{3}$$

In order to enable the above mentioned changes in the connection of the coils to be easily effected, it is necessary to provide switching devices between the three sets of coils. There are a number of ways in which the switching devices can be arranged and one arrangement is that shown in FIG. 6 of the accompanying drawings. Referring to FIG. 6 of the accompanying drawings it will be seen that the three phases of the mains supply are connected directly to the coils of set 14 and the latter are then connected to the switch arms 1, 2 and 3 of a 3-position rotary switch 1RO. The switch contacts 1, 2 and 3 are connected to the coils of set 16 and these coils in turn are connected to the switch arms 1, 2 and 3 of a second 3-position rotary switch 2RO which is ganged with the switch 1RO. The contacts of switch 2RO are connected to the coils of set 15 through three ganged reversing switches 1RE, 2RE and 3RE.

With all the switches in the position shown in FIG. 6 of the accompanying drawings, corresponding coils in each of the three sets are fed by current of the same phase and the arrangement corresponds to that shown in FIG. 2 of the accompanying drawings. Now assume that the rotary switches are operated so that the switch arms engage with contacts 2 and that the reversing switches are operated. With this setting, current from the red phase of the mains supply will be fed through the upper coil of set 14, switch arm 1 and contact 2 of switch 1RO, the lower coil of set 16, switch arm 3 and contact 2 of switch 2RO, the reversing switch 2RE and the middle coil of set 15 to the neutral point N. Current from the yellow phase of the mains supply will be fed through the middle coil of set 14, switch arm 2 and contact 2 of switch 1RO, the upper coil of the set 16, switch arm 1 and contact 2 of switch 2RO, the reversing switch 3RE and the lower coil of set 15 to the neutral point. Finally current from the blue phase of the mains supply will be fed through the lower coil of set 14, switch arm 3 and contact 2 of switch 1RO, the middle coil of set 16, switch arm 2 and contact 2 of the switch 2RO, reversing switch 1RE and the upper coil of set 15 to the neutral point N. Hence current from phase R flows through the upper coil of set 14, current from phase Y flows through the upper coil of set 16 and current from phase B reversed flows through the upper coil of set 15. There is, therefore, a phase difference of 60 degrees between the current flowing in the upper coil of set 14 and the upper coil of set 15 and also between the current flow in the upper coil of set 16 and the upper coil of set 15. Similar phase differences exist between the other coils of the sets, the currents in the middle coils being Y, B and −R and in the lower coils B, R and −Y. It will thus be seen that this setting corresponds to the arrangement of FIG. 3 of the accompanying drawings, the phase displacement being 120 degrees and the condition positive.

If now the rotary switches are rotated to contacts 3 and the reversing switches remain operated, the setting will correspond to the arrangement of FIG. 4 of the accompanying drawings, the phase displacement being still 120 degrees but the condition is now negative.

If now the reversing switches 1RE to 3RE are returned to their normal position and the rotary switches are maintained on contacts 3 the upper coils of the three sets 14, 16 and 15 will be fed by current from phases R, B and Y respectively, the middle coils will be fed by current from phases Y, R and B respectively and the lower coils will be fed by current from phases B, Y and R respectively. This corresponds to the arrangement of FIG. 5, the phase difference between currents being 120 degrees and the phase displacement 240 degrees in the positive sense.

A phase difference of 120 degrees in the negative sense is obtained by returning the rotary switches to contacts 2 and maintaining the reversing switches in their unoperated condition. The upper coils of the three sets will then be fed by currents from phases R, Y and B the middle coils from the phases Y, B and R and the lower coils from the phases B, R, Y.

If a phase difference of 120 degrees in the positive and negative sense is required without the 60 degree difference, the reversing switches are not necessary and the switching arrangement is reduced to that shown in FIG. 7 of the accompanying drawings. With the rotary switches 1RO and 2RO in the position shown in the drawing, the phase displacement is zero. With the switch arms on contacts 2, the current fed to the coils of the three sets is as follows:

| 14 | 16 | 15 |
|----|----|----|
| R<br>Y<br>B | Y<br>B<br>R | B<br>R<br>Y |

This corresponds to the negative condition. With the switch arms on contacts 3, the current fed to the coils is as follows:

| 14 | 16 | 15 |
|----|----|----|
| R<br>Y<br>B | B<br>R<br>Y | Y<br>B<br>R |

This is the positive condition and corresponds to FIG. 5 of the accompanying drawings.

The total amount of phase displacement in the moving magnetic field between the two ends of the primary winding may be increased by introducing a further two sets of coils into the primary winding in the manner shown in FIG. 8 of the accompanying drawings, the same references being used in FIGS. 1 and 8 of the accompanying drawings to indicate the same parts. In the winding shown in FIG. 8 of the accompanying drawing, the two additional sets of coils are indicated at 17 and 18. In the arrangement described in said copending application, the sets of coils 14, 16 and 17, 18 are fed by current from separate phase shifting devices such that if the currents fed to the sets of coils 14, 16 exhibit a phase difference of $\theta$ degrees with respect to the mains, the currents fed to the sets of coils 17, 18 exhibit a phase difference of $2\theta$ degrees with respect to the mains. If therefore the phase difference between current in the sets of coils 14 and 15 and the sets of coils 16 and 15 is $+\theta$ and $-\theta$ degrees respectively and between current in the sets of coils 17 and 15 and the sets of coils 18 and 15 is $+2\theta$ and $-2\phi$ degrees respectively, the total phase displacement in the moving magnetic field will be $4\theta$. This principle can be extended to the present invention as will be understood from the following explanation with reference to FIG. 9 of the accompanying drawings.

With the five sets of coils connected up as shown in FIG. 9 of the accompanying drawings, it will be seen that the phase of the currents flowing in coils of the sets 14, 15 and 16 corresponds with that shown in FIG. 5 of the accompanying drawings and hence as far as these sets are concerned, there is a phase difference of 120 degrees in the positive sense. As far as sets 17 and 18 is concerned, the phase of the currents flowing in the coils of set 17 is advanced by 240 degrees with respect to the phase of the currents flowing in the coils of set 15 while that of the currents flowing in the coils of set 18 is retarded by 240 degrees with respect to the phase of the currents flowing in the coils of set 15. The phase displacement in the moving magnetic field is thus in the positive sense and is twice that of the phase difference of the currents flowing in coils of the sets 17 and 18, i.e., 480 degrees.

A switching arrangement which gives the connections shown in FIG. 9 of the accompanying drawings is shown in FIG. 10 of the accompanying drawings. Two ganged rotary switches 3RO and 4RO are used and with the switches in the position shown in FIG. 10 of the accompanying drawings, the phase of the currents fed to corresponding coils of all sets is the same. With the switch arms on contacts 2, the coils are connected in the manner shown in FIG. 9 of the accompanying drawings and with the switch arms on contacts 3, the same phase displacement of 480 degrees is obtained but in the negative sense.

The arrangement shown in FIG. 10 of the accompanying drawings can be extended by the use of reversing switches to provide possible phase displacements of 240 or 480 degrees in both positive and negative senses. This switching arrangement is shown in FIG. 11 of the accompanying drawings. With the rotary switches 3RO and 4RO in the position shown corresponding coils of all sets are fed with current of the same phase. With the rotary switches on contacts 2 and the reversing switches in the positions shown, the phases of the currents fed to the coils is shown in the following table:

| 14 | 18 | 16 | 17 | 15 |
|----|----|----|----|----|
| R<br>Y<br>B | R<br>Y<br>B | B<br>R<br>Y | B<br>R<br>Y | Y<br>B<br>R |

This is the same as that shown in FIG. 9 of the accompanying drawings and gives a phase displacement of 480 degrees in the positive sense. With the rotary switches on contacts 3, the phase displacement is 480 degrees in the negative sense. If now the reversing switches 4RE to 6RE and 7RE to 9RE, which may all be ganged, are operated and the rotary switches set to contacts 2, the connections to the coils of the various sets are as follows:

| 14 | 18 | 16 | 17 | 15 |
|----|----|----|----|----|
| −R<br>−Y<br>−B | R<br>Y<br>B | −B<br>−R<br>−Y | B<br>R<br>Y | Y<br>B<br>R |

A phase difference of 60 degrees now exists between the currents in the coils of the set 14 and in the coils of the set 15 and between the currents in the coils of the set 16 and in the coils of the set 15 whilst a phase difference of 120 degrees exists between the coils of sets 17 and 15 and between the coils of sets 18 and 15, i.e., the phase displacement is 240 degrees. This is the negative condition and the positive condition, which is given below, is obtained by maintaining the reversing switches operated and setting the rotary switches on to contacts 3:

| 14 | 18 | 16 | 17 | 15 |
|----|----|----|----|----|
| −R<br>−Y<br>−B | R<br>Y<br>B | −Y<br>−B<br>−R | Y<br>B<br>R | B<br>R<br>Y |

Other switching arrangements can be developed to give other phase displacements but it is believed that the above examples will be sufficient to enable the principle of the invention to be understood. However, in the above examples, the number of phase displacements obtainable is limited to five, e.g. in the case of a primary winding having three sets of coils, 0, ±120 degrees, ±240 degrees or in the case of a primary winding having five sets of coils, 0, +240 degrees, +480 degrees. Switching arrangements can, however, be developed to give a greater number of phase displacements and the arrangement shown in FIG. 12 of the accompanying drawings gives a total of nine, namely, 0, ±60, ±120, ±180, ±240 degrees at the cost of introducing a three phase transformer to enable star-delta switching to be employed. The settings required to give these displacements are given in the following table, where "O" signifies "operated," "N" signifies "normal" and 1, 2 or 3 indicate the contacts on which the arms of the switches 5RO and 6RO are set:

*Table 1*

| Phase difference | Phase displacement | 5RO | 10RE-12RE | 6RO | 7RO | 13RE-15RE | 8RO |
|---|---|---|---|---|---|---|---|
| 0 | 0 | 1 | N | N | 1 | N | 1 |
| −120° | −240° | 2 | N | N | 2 | N | 1 |
| +120° | +240° | 3 | N | N | 3 | N | 1 |
| +60° | +120 | 2 | N | N | 2 | O | 1 |
| −60° | −120° | 3 | N | N | 3 | O | 1 |
| +30° | +60° | 3 | O | O | 2 | O | 3 |
| −30° | −60° | 2 | O | O | 3 | O | 3 |
| +90° | +180° | 1 | O | O | 2 | O | 2 |
| −90° | −180° | 1 | O | O | 2 | N | 2 |

Consideration will now be given to the steps to be taken in designing a machine having a number of discrete speeds and at the same time having the characteristics of a conventional induction machine. In a phase-mixing machine such as that previously proposed, where the speed is capable of continuous variation, the primary winding is discontinuous, i.e., it does not embrace the whole of the secondary winding, and the portion of the primary winding core which is unwound is either removed entirely or provided with a short-circuited winding to clear the rotor or secondary winding of flux as it passes from the exit end to the entry end of the primary winding. This is necessary to enable the machine to operate at speeds corresponding to non-integral pole numbers. Such a machine is, however, subject to certain limitations as regards pole numbers and this sets a limit to the efficiency and output of the machine and makes the machine a multi-polar one, so that it is only capable of slow speed operation.

It has been found by experiment that if the portion of the core which is not wound, i.e., the inactive arc, is neither removed nor provided with a short-circuited winding so that the rotor flux is allowed to carry over from the exit edge to the entry edge, then high efficiency and power output are possible provided that the active arc of the primary winding corresponds to a section of the primary winding of a conventional machine having an even number of poles. As an example of this condition, if the primary winding extends over an arc of 270 degrees, it should be arranged to generate 3 poles since it would then correspond to a section of the primary winding of a conventional 4-pole machine. In such a case the behaviour of the machine with a discontinuous primary winding is substantially the same as that of a conventional machine. Now this condition may be written $$n \cdot \frac{360}{\alpha} = 2p \qquad (1)$$

where $\alpha$ degrees is the active arc of the primary winding, $n$ is the number of poles generated by the primary winding for $\theta=0$, i.e., the basic pole number, and $p$ is an integer. If the winding consists of 5 sets of coils to give phase displacements of $\pm \theta$ and $\pm 2\theta$, a phase difference of $\pm 120$ degrees between the $2\theta$ coils and the mains obtained in the manner previously described will add $\pm 2 \times 120°$ or $\pm 1\frac{1}{3}$ poles to the basic pole number $n$ while a similar phase difference of $\pm 240$ degrees will add $\pm 2 \times 240°$ or $\pm 2\frac{2}{3}$ poles. Hence in Equation 1, $n$ becomes $(n \pm 1\frac{1}{3})$ and $(n \pm 2\frac{2}{3})$ for these phase displacements. Obviously if $n$ is altered, $p$ must also be altered and hence the following equations may be written down $$(n+1\frac{1}{3}) \cdot \frac{360}{\alpha} = 2(p+1) \qquad (2)$$

$$(n+2\frac{2}{3}) \cdot \frac{360}{\alpha} = 2(p+2) \qquad (3)$$

$$(n-1\frac{1}{3}) \cdot \frac{360}{\alpha} = 2(p-1) \qquad (4)$$

$$(n-2\frac{2}{3}) \cdot \frac{360}{\alpha} = 2(p-2) \qquad (5)$$

Although there are five equations, there are really only two unknown quantities and the unique solution for all five equations simultaneously merely requires that $$1\frac{1}{3} \cdot \frac{360}{\alpha} = 2$$

or $\alpha = 240$ degrees. All five equations are then satisfied by $$n = \frac{4}{3} \cdot p$$

Now the minimum number of poles is 2, giving a speed of 3000 r.p.m., and Equation 5 will then apply. Therefore $2(p-2)=2$, $p=3$, whence $n=4$. Thus for zero phase displacement, the machine will operate as a $2p$ pole machine, i.e., a 6-pole machine giving a speed of 1000 r.p.m. With a phase displacement of $+240$ degrees the machine operates as a $2(p+1)$ pole machine, i.e., an 8-pole machine giving a speed of 750 r.p.m. A phase displacement of $-240$ degrees gives a 4-pole machine with a speed of 1500 r.p.m. A phase displacement of $+480$ degrees gives a 10-pole machine with a speed of 600 r.p.m. and one of $-480$ degrees gives a 2-pole machine as previously mentioned. The speeds obtainable are therefore 3000, 1500, 1000, 750 and 600 r.p.m.

Another range of speeds may be obtained, for instance, by putting $2(p-2)=4$ or $p=4$, $n=5\frac{1}{3}$. The speeds obtainable are then 1500, 1000, 750, 600, 500 r.p.m. It will be understood that other ranges may be obtained by giving other values to $2(p-2)$.

If three sets of coils only are provided giving phase displacements of $\pm \theta$ then $\pm \frac{2}{3}$ pole or $\pm 1\frac{1}{3}$ poles are added to the basic pole number resulting in a value for $\alpha$ of 120 degrees. This is an uneconomic value and in any case the flux would tend to decay in being carried round the inactive arc, which is 240 degrees. The five equations may, however, be written as follows:

$$n \cdot \frac{360}{\alpha} = 2p \qquad (1)$$

$$(n+\frac{2}{3})\frac{360}{\alpha} = 2(p+2) \qquad (6)$$

$$(n+\frac{4}{3})\frac{360}{\alpha} = 2(p+4) \qquad (7)$$

$$(n-\frac{2}{3})\frac{360}{\alpha} = 2(p-2) \qquad (8)$$

$$(n-\frac{4}{3})\frac{360}{\alpha} = 2(p-4) \qquad (9)$$

In this case $2(p-4)=2$ or $(p-4)=1$ so that $p=5$ and $n=6\frac{2}{3}$. The possible speeds are therefore 3000, 1000, 600, 428, 333 r.p.m. Again if $p-4=2$, $p=6$ and $n=8$ giving the following speed range: 1000, 600, 428, 333, 273 r.p.m.

Induction machines having only three discrete speeds are possible and can be constructed having 3 or 5 sets of stator coils. If three sets only are used ($\pm\theta$) and the phase displacement is $\pm 120$ degrees, the equations are:

$$n \cdot \frac{360}{\alpha} = 2p \quad (1)$$

$$(n+\tfrac{2}{3}) \cdot \frac{360}{\alpha} = 2(p+2) \quad (10)$$

$$(n-\tfrac{2}{3}) \cdot \frac{360}{\alpha} = 2(p-2) \quad (11)$$

These equations give speeds of 3000, 1000 and 600 r.p.m. for $p=3$. Other speed ranges may be obtained by choosing other values for $p$. For instance if $p=5$, speeds of 1000, 600 and 428 r.p.m. are obtained. If the phase shift is made 120 degrees instead of 60 degrees, two of the possible speed ranges are 3000, 1500, 1000 r.p.m. and 1500, 1000, 750 r.p.m. Where three speeds only are required the use of $\theta$ and $2\theta$ windings is no advantage since the same three speeds are obtained with somewhat less efficient working and more complicated winding and switching.

It will be remembered that when considering an arrangement employing three sets of coils with possible phase displacement of $\pm\theta$, it was stated that the resulting value for $\alpha$ (120 degrees) was an uneconomic one. It is however possible, according to a feature of the invention, to use two such arrangements as shown in FIG. 13 of the accompanying drawings, the references having the same significance as in FIG. 1. Referring to FIG. 13, it will be seen that there are two primary windings provided on separate cores 10, 10', the cores being equidistantly spaced around the rotor axis. The phase of the currents fed to the sets of coils 14, 14' is the same and similarly for the sets of coils 16, 16'. The sets of coils 14, 14'; 15, 15' and 16, 16' are fed in parallel with suitably phased currents and the arrangement avoids unbalanced magnetic pull at standstill. Further the switching arrangements provided for speed control are simpler than those for a machine using five sets of coils with a value for $\alpha$ of 240 degrees. The primary windings of the arrangement shown in FIG. 13 are shown in developed form in FIG. 14 of the accompanying drawings and FIG. 15 of the accompanying drawings shows the waveform of the moving magnetic field at a particular instant of time, for zero phase displacement, the machine having basically 6 poles. If now the phase difference of the currents fed to the sets of coils 14, 14' and 16, 16' is adjusted so that each primary winding generates 1⅓ poles, the machine would then appear to have 4 poles but there would be phase discontinuities in the magnetic field, as shown in FIG. 16 of the accompanying drawings. It will be understood that the phase discontinuities arise from the fact that the phase of the currents fed to the centre coils A and B do not change since they carry mains currents only.

Figure 17:
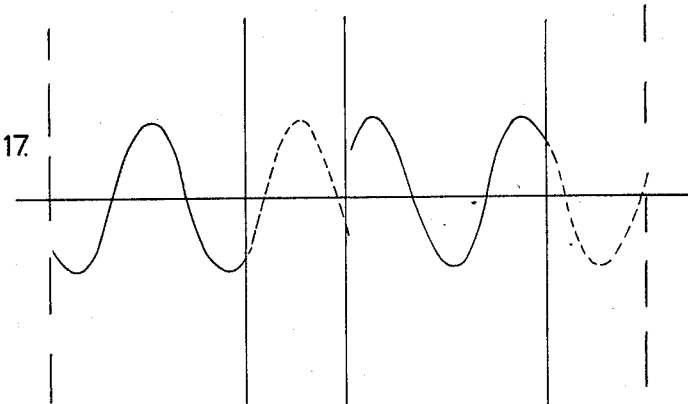

FIG. 17 of the accompanying drawings shows the waveform when the phase difference is adjusted to give an 8-pole machine and again a phase discontinuity occurs. FIGS. 18 and 19 of the accompanying drawings show the waveforms when the phase difference is adjusted to give a 10-pole machine and a 2-pole machine respectively and it will be seen that in both these cases there is no phase discontinuity.

However, the machine can run as a 4-pole and 8-pole machine provided that one of the primary windings is phase-inverted with respect to the other. An examination of FIGS. 16 and 17 will show that inversion of the waveform due to one primary winding will ensure that there is no phase discontinuity. Therefore, when employing two primary windings such as shown in FIG. 13 and assuming a basically 6-pole machine, it is necessary to provide suitable switching arrangements to enable the machine to operate, for example, as a 2, 4, 8 and 10-pole machine and also to provide additional switching arrangements which will phase invert one primary winding with respect to the other when the machine operates as a 4 or 8-pole machine. Such additional switching arrangements are shown in FIG. 20 of the accompanying drawings, the switches 1PI, 2PI and 3PI being ganged. In the drawing the position of the switches corresponds to that for the 2 and 10-pole machine, the two primary windings being indicated by PW1 and PW2.

It should also be explained that the invention is not limited to the values of $\alpha$ obtained from Equations 1 to 6 for the various conditions discussed previously, but any value of $\alpha$ may be employed. Thus consider the primary winding shown in developed form in FIG. 21 of the accompanying drawings. There is now no slot which contains phase shift windings only. The arc length of the original winding from which some conductors have been omitted is $\alpha$ degrees while the new arc length is $\beta$ degrees. When the switching arrangements are set to give a phase difference of 120 degrees, the phase of the current in the first wound slot is advanced by $$\frac{\beta}{\alpha} \times 120 \text{ degrees}$$

and the phase of the current in the last wound slot is retarded by $$\frac{\beta}{\alpha} \times 120 \text{ degrees}$$

The total phase displacement is therefore $$2 \times \frac{\beta}{\alpha} \times 120 \text{ degrees} = 240\frac{\beta}{\alpha} \text{ degrees}$$

Similarly when the switching arrangement is set to give a phase difference of 60 degrees, the total phase displacement is $$120\frac{\beta}{\alpha} \text{ degrees}$$

It will also be understood that phase displacements of $$-240\frac{\beta}{\alpha} \text{ and} -120\frac{\beta}{\alpha} \text{ degrees}$$

can be obtained.

If there are $n$ poles on the $\alpha$ degree arc then there will be $$n \cdot \frac{\beta}{\alpha}$$

poles on the $\beta$ degree arc, $\alpha$ and $n$ having the same significance as in Equations 1 to 6. Hence $$n \cdot \frac{\beta}{\alpha} \times \frac{360}{\beta} = 2p$$

$$n \cdot \frac{360}{\alpha} = 2p$$

which is exactly the same as Equation 1 and the other equations follow.

As a result of this a particularly advantageous form of the invention follows and is shown diagrammatically in FIG. 22 of the accompanying drawings. This shows two primary windings each having five sets of coils. The primary windings are designed for $\alpha=240$ degrees if fully wound and are then "chopped off" to 180 degrees. The two primary windings are then joined to form a continuous winding to give the previously mentioned advantages of a conventional induction machine.

We claim:

1. An induction machine comprising a first slotted structure, a primary winding accommodated in slots of said first slotted structure, a second slotted structure movable with respect to said first slotted structure, a secondary winding accommodated in the slots of said second slotted structure and electromagnetically coupled to said primary winding, said primary winding consisting of at least first and second sets of coils which overlap so that the magnetomotive force in at least some of the slots of said first slotted structure is generated by the addition of the magnetomotive forces caused by current flow in the conductors of coils of said first and second set, each of said sets of coils being so wound that the magnitude of the current flow in the conductors in the slots of said first slotted structure due to the coils of one set is a single-valued function of the distance along the arc of said first slotted structure occupied by said one set of coils, a three-phase alternating current supply and switching means for connecting different phases of the current supply in different combinations to corresponding coils of said sets of coils to enable different predetermined values of the average phase difference between the currents in adjacent slots to be obtained.

2. An induction machine as claimed in claim 1, wherein said primary winding comprises first, second and third sets of coils said alternating current supply being connected to said first set of coils and the switching arrangements comprise a first three-position rotary switch connected between said first and second sets of coils and a second three-position rotary switch connected between said second and third sets of coils to enable three predetermined values of the average phase difference between the currents in adjacent slots to be obtained.

3. An induction machine as claimed in claim 2, wherein the switching arrangements also include a reversing switch for reversing the direction of current flow through the coils of said third set to enable five predetermined values of the average phase difference to be obtained.

4. An induction machine as claimed in claim 1, wherein said primary winding comprises first, second, third, fourth and fifth sets of coils said alternating current supply being connected to said first set of coils and the switching arrangements comprises a first three-position rotary switch connected between said second and third sets of coils and a second three-position rotary switch connected between said fourth and fifth set of coils, the first and second sets of coils and the third and fourth sets of coils being directly connected together whereby three predetermined values of the average phase difference between the currents in adjacent slots is obtained.

5. An induction machine as claimed in claim 4, wherein the switching arrangements also include a first reversing switch for reversing the direction of current flow through the coils of said first set and a second reversing switch for reversing the direction of current flow through the coils of said third set whereby five predetermined values of the average phase difference between the currents in adjacent slots is obtained.

6. An induction machine as claimed in claim 1, and including first and second primary windings each accommodated on a separate slotted structure, the slotted structures being equidistantly spaced around said secondary winding.

7. An induction machine as claimed in claim 1 and including further switching arrangements whereby the currents fed to said first and second primary winding are phase invertible with respect to each other.

8. An induction machine as claimed in claim 6, wherein said first and second primary windings are constructed to have an arc length greater than 180 degrees and part of each slotted structure together with the coils accommodated therein is removed from each end of each slotted structure to give an arc length of 180 degrees whereby the two slotted structures are joined to embrace completely the secondary winding.

References Cited in the file of this patent
UNITED STATES PATENTS
2,978,623      Williams et al. _____ Apr. 4, 1961